(12) United States Patent
Lewis

(10) Patent No.: US 7,233,251 B2
(45) Date of Patent: Jun. 19, 2007

(54) ELECTRONIC TERMITE DETECTOR

(76) Inventor: Mark Robert Lewis, 2 Knott Court, Whitfield, Cairns, Queensland 4870 (AU) 4870

( * ) Notice: Subject to any disclaimer, the term of this patent is extended or adjusted under 35 U.S.C. 154(b) by 131 days.

(21) Appl. No.: 11/059,848

(22) Filed: Feb. 16, 2005

(65) Prior Publication Data

US 2005/0190063 A1   Sep. 1, 2005

(30) Foreign Application Priority Data

Feb. 17, 2004  (AU) ............................. 2004900775
Nov. 16, 2004  (AU) ............................. 2004229096

(51) Int. Cl.
*G08B 23/00* (2006.01)

(52) U.S. Cl. ............... 340/573.2; 340/556; 340/693.5; 43/124; 43/132.1

(58) Field of Classification Search ............ 340/693.5, 340/573.2, 555–557; 43/124, 132.1; 250/200, 250/221–224
See application file for complete search history.

(56) References Cited

U.S. PATENT DOCUMENTS

| | | | |
|---|---|---|---|
| 5,571,967 A | | 11/1996 | Tanaka et al. |
| 5,575,105 A | * | 11/1996 | Otomo ...................... 43/132.1 |
| 5,815,090 A | | 9/1998 | Su |
| 6,052,066 A | | 4/2000 | Su |
| 6,532,838 B1 | * | 3/2003 | Cates ........................ 73/865.8 |
| 6,594,945 B1 | | 7/2003 | Fu |
| 6,668,669 B2 | | 12/2003 | Cates |
| 6,882,284 B2 | * | 4/2005 | Lake et al. .............. 340/693.5 |
| 2002/0144452 A1 | | 10/2002 | Beronza |

FOREIGN PATENT DOCUMENTS

| | | |
|---|---|---|
| JP | 9-121742 | 5/1997 |
| WO | WO 03/020022 A1 | 3/2003 |

* cited by examiner

*Primary Examiner*—Jeffery Hofsass
*Assistant Examiner*—Hongmin Fan
(74) *Attorney, Agent, or Firm*—Knobbe Martens Olson & Bear

(57) ABSTRACT

A device (10) for detecting the presence of light averse insects, such as termites, is in the form of a peg (11) having a cavity (14) into which termites may enter when the peg is installed in the ground or other area where the presence of termites is to be detected. The cavity may include a termite bait. A light sensor (25) is located in the cavity, and has an output which is responsive to the detection of light. The light sensor operatively receives light from a light emitting device (LED) (23) only through a narrow passage extending through the peg from the LED (23) to the cavity (14). The passage is adapted to be at least partially blocked by the light averse insects to shield the cavity, and hence the light sensor means, from light from the passage. When the light sensor means (25) does not detect sufficient light, an electrical circuit (22) connected to the output of the light sensor means triggers an alarm light (26) to signal an alarm or alert condition.

18 Claims, 5 Drawing Sheets

ELECTRONIC TERMITE DETECTOR

FIELD OF THE INVENTION

This invention relates to an apparatus and method for detecting the presence of termites, and similar insects of the isoptera order which are averse to light. In particular, the invention is directed to an apparatus and method for electronically detecting termite activity using an optical sensor.

BACKGROUND ART

The dangers of termites (also known as "white ants") are well known and documented. Termites can cause major damage to buildings in a relatively short time, and it is therefore important that property owners be vigilant in detecting the presence of termites.

However, as termites live and nest underground or in concealed places, it is not normally possible to detect their presence visually. So-called "mud trails" on a surface may indicate the presence of termites, but these mud trails are normally constructed by termites in obscured places. Moreover, the absence of mud trails does guarantee that there is no termite infestation. Termites may gain access to the interior of a building through cracks in concrete slabs or through construction joints which are concealed from view. Detection of termite activity by routine visual inspection is therefore an unreliable method.

A traditional method of preventing termite infestation is to treat the soil under and/or around a building with a chemical which is toxic to termites. However, due to health and environmental concerns, highly toxic chemicals, such as organo-chlorides, have now been phased out and the permitted chemicals are far less effective and have a much shorter active life.

Physical termite barriers such as stainless steel mesh are relatively expensive, and may lead to a false sense of security since these barriers are known to fail. Even a small crack is sufficient to permit termites to enter and infest a building.

It is also known to use "bait stations" positioned around a building. These bait stations contain a food, such as cardboard, which is attractive to termites. The bait stations need to be checked manually on a regular basis. If termite activity is noticed, the bait may be replaced by a toxic bait which, hopefully, is taken to the termite nest by the termites to kill the colony. However, such toxic baits often fail to destroy the entire colony. The surviving termites can establish a new colony in a different location close to the building, from which they can infest the building. Furthermore, the checking of bait stations is time consuming and tedious, and must be conducted frequently in order to obtain early indication of termite activity.

Electronic termite baits have been developed to generate signals when termite activity is detected. These signals can be used to trigger an alarm. A plurality of electronic baits can be connected to a central control station, so that multiple baits can be continually monitored. Examples of such electronic termite baits can be found in international patent application no. PCT/AU02/01201, U.S. Pat. Nos. 6,052,066, 5,815,090, 5,571,967 and U.S. patent application 2002/0144452.

The termite detection systems described in the abovementioned patents generally require the termites to eat through some edible bait or conductive metal to trigger a mechanical or electrical switch or flag. Such systems are not always reliable or effective. For example, it may take some time for the termites to eat through the bait or conductive metal, during which time substantial damage may be done to the building by other termites. In some cases, the bait or conductive metal may not be eaten through completely, and the mechanical or electrical switch or flag may not be triggered. Detectors which rely on termites eating through metal conductors are unreliable, as the termites might elect not to eat the metal when there is more easily digested food available.

U.S. patent application 2002/0144452 discloses a termite detection system which uses a microchip to detect the sound made by termites. It is believed that this system would be impractical since, depending on its sensitivity, the microchip might fail to detect the sounds made by termites or may generate many false alarms triggered by extraneous sounds, thereby rendering the system unreliable.

It is an aim of this invention to provide method and apparatus for detecting the presence of termites, which overcome or ameliorate one or more of the disadvantages or problems described above, or at which at least provide the consumer with a useful choice.

SUMMARY OF THE INVENTION

This invention is based on the recognition that termites are averse to light and will try to block out light entering through small apertures by building "mud" plugs in the apertures.

In one broad form, the invention provides a device for detecting the presence of light averse insects, the device including a cavity into which termites may enter, light sensor means located in the cavity, and having an output which is responsive to the detection of light, a narrow passage communicating with the cavity, through which both the cavity and light sensor means operatively receive light, the passage being adapted to be at least partially blocked by the light averse insects to thereby shield the light sensor means from light from the passage, and electrical circuit means connected to the output of the light sensor means for signalling an alarm or alert condition when the light sensor means does not detect sufficient light.

In another form, the invention provides a method for detecting the presence of light averse insects such as termites, comprising the steps of providing light through a narrow passage to a space in which the presence of such insects is to be detected, positioning light sensor means in the space to receive the light only through the passage, the passage being adapted to be at least partially blocked by the light averse insects to thereby shield the light sensor means from the light, and detecting when the light sensor means does not detect sufficient light through the passage.

Typically the light averse insects are termites. However, the term "light averse insects" as used herein is intended to include, where the context permits, other insects which are photophygous, photophobic, negatively phototactic or otherwise exhibit an aversion to light. The light is normally visible light, but may be infrared or ultra-violet light.

The device may comprise light means, such as an electrical light emitting device, positioned to emit the light to the cavity through the passage. Alternatively, the light may be sunlight.

Preferably, the device includes visual and/or audio alarm means connected to the electrical circuit for signalling when the light sensor means does not detect sufficient light.

The device is suitably in the form of a short wooden peg or stake having the cavity, light sensor means and the narrow passage therein, and a cap member having the electrical circuit means therein, the cap member being fitted to the top of the peg. The peg is typically placed in the ground in a desired location, e.g. adjacent a building. Alternatively or additionally, the device may be installed indoors.

Advantageously, the cavity in the device houses a bait or attractant for termites, or material which is edible by the termites.

In use, the device is placed in the ground, in a wall of a building, or other location where the presence of termites is to be detected. If termites come near the device, they will be attracted to the bait in the space within the device. However, as the termites are averse to the light, they will seek to block out the light shining through the passage into the space by building a "mud" plug in the passage, typically from soil detritus. This mud plug prevents the light from reaching the light sensor, or reduces the amount of light received by the light sensor. The absence or reduction of light impinging on the light sensor is detected by the electrical circuit, which generates an alarm or alert condition indicating probable termite activity.

A plurality of such termite detecting devices may be placed over a desired area and/or building, and connected to a base station which continually monitors the devices to detect any alarm condition. Thus, each device is continually monitored for termite activity, but the property owner or operator is only notified if probable termite activity is detected.

In order that the invention may be more readily understood and put into practice, a preferred embodiment thereof will now be described, by way of example only, with reference to the accompanying drawings.

DESCRIPTION OF PREFERRED EMBODIMENT

Figure 1:
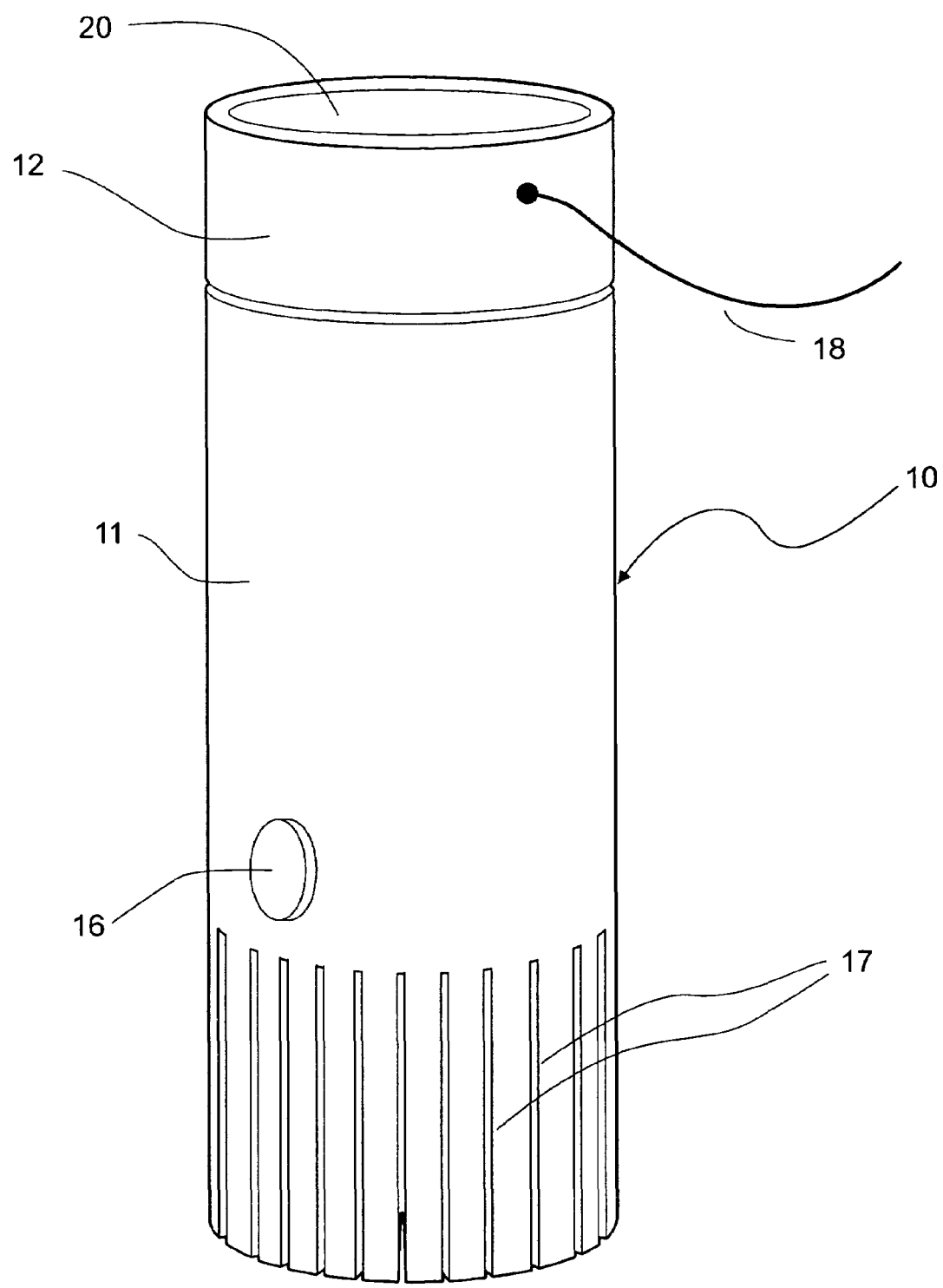
FIG. 1 is a perspective view of a termite detecting device according to one embodiment of the invention.

As shown in the drawings, a termite detection device 10 according to one embodiment of the invention is of generally cylindrical form, and comprises a lower tubular portion (hereafter referred to as a "peg") 11, and an upper cap portion (hereafter referred to as the "cap") 12. The cap 12 is located on top of the peg 11, and may be affixed thereto by any suitable means, e.g. a threaded connection, a bayonet mount, a clip or magnetic catch, silicon adhesive, or other suitable means. Preferably, cap 12 is detachable from peg 11.

Figure 2:
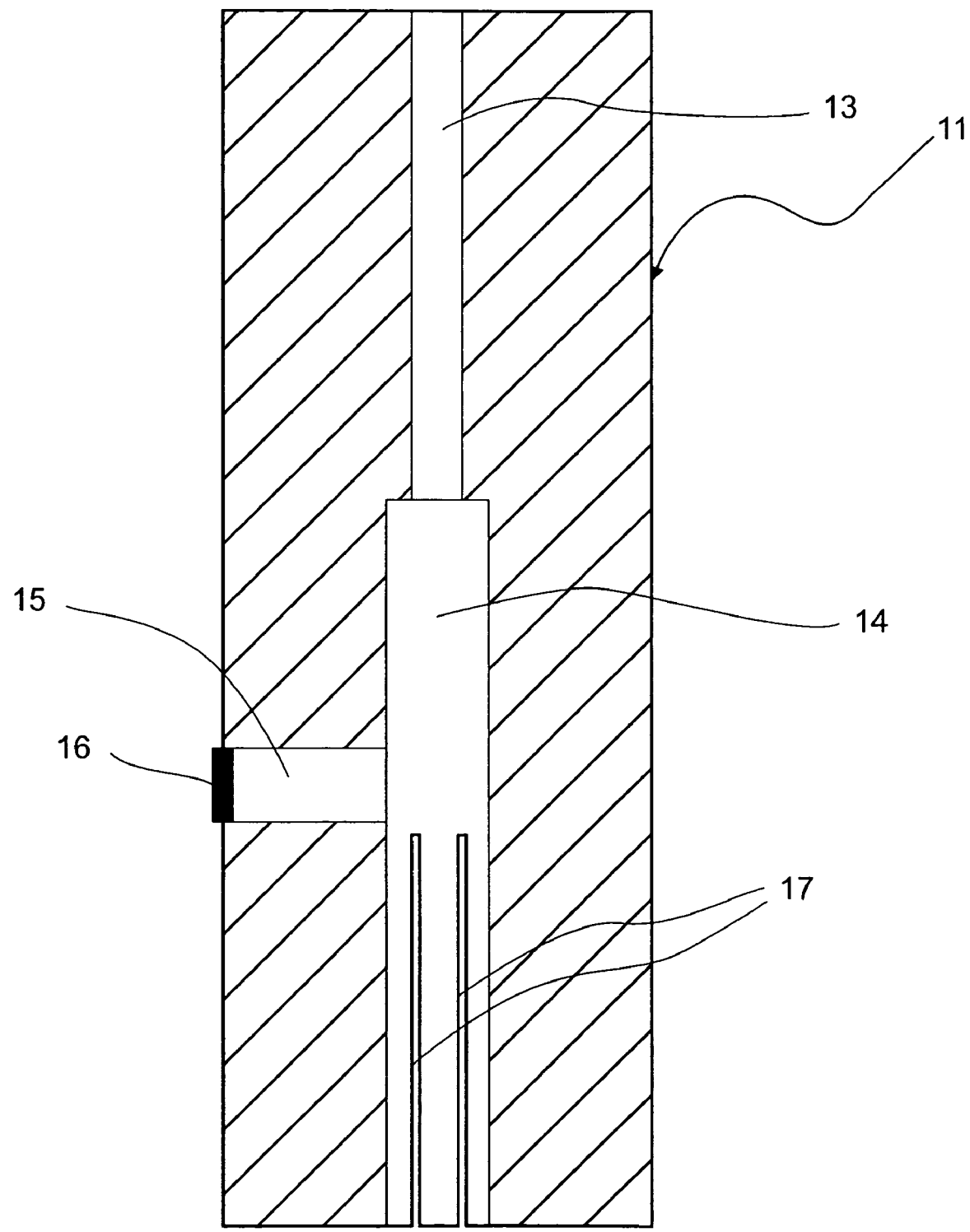
FIG. 2 is a sectional elevation of the peg portion of the device of FIG. 1.

Peg 11 is shown in more detail in FIG. 2. The peg 11 is generally cylindrical in form, and has a stepped axial bore comprising a narrow upper bore 13 communicating with a wider lower bore 14. The bores 13, 14 are open at the upper and lower ends of the peg, respectfully. A radial bore 15 communicates with the lower bore 14, and has a stopper 16 removably inserted in its outer end.

The peg 11 is typically made of wood, but may alternatively be formed of plastics material, metal or any other suitable material. A plurality of circumferentially-spaced radial slots 17 are formed in the lower end of the peg 11, e.g. by a saw.

Figure 3:
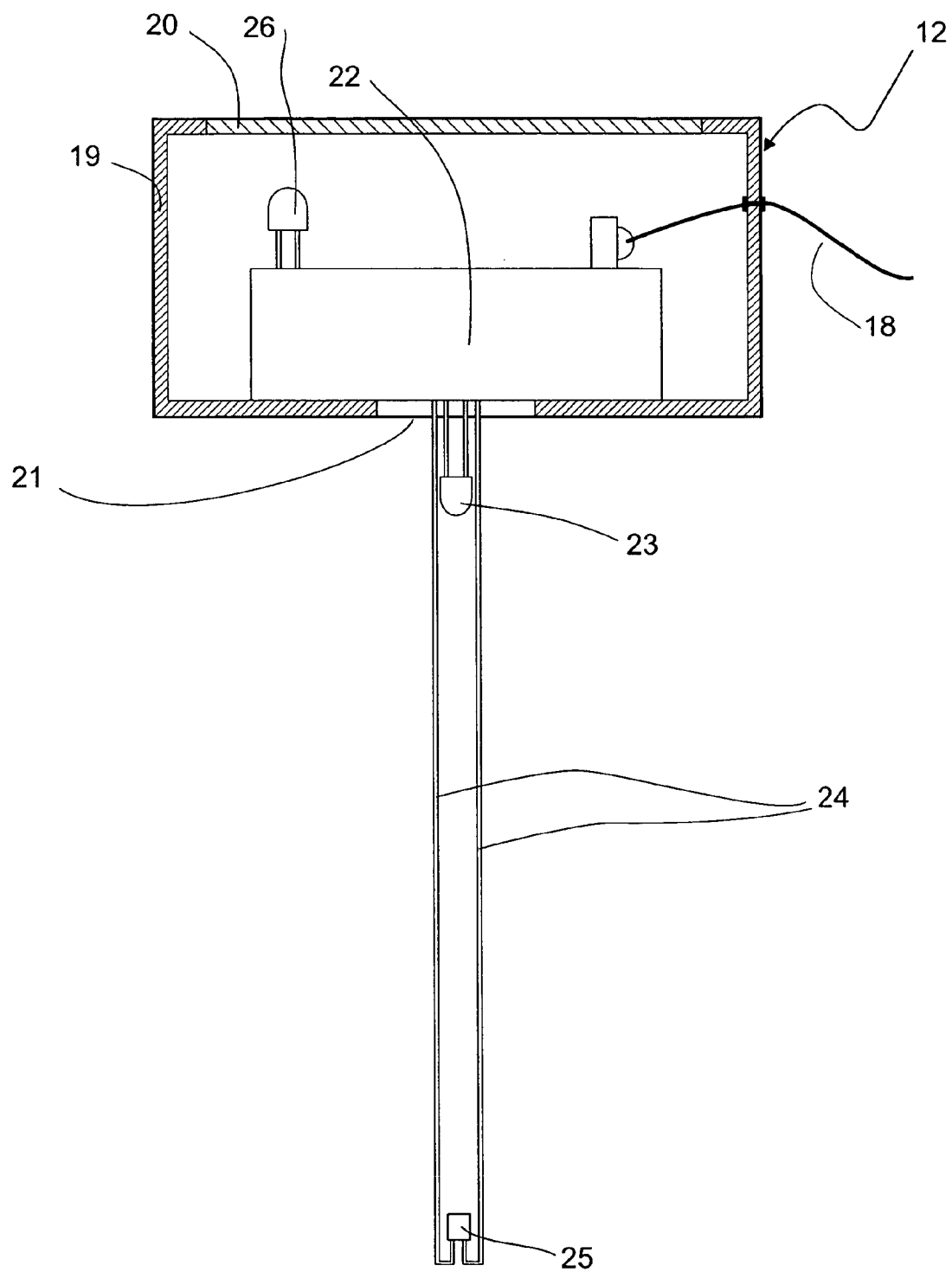
FIG. 3 is a part-sectional elevation of the cap portion of the device of FIG. 1.

The cap 12 is shown in more detail in FIG. 3. It comprises a generally cylindrical weatherproof housing 19 having a transparent or translucent insert 20 in its top end, and an opening 21 in its lower end. The insert 20 may be screwed into an opening in the top end of the housing 19, or snap fitted therein in a watertight manner, or otherwise sealingly fitted to the top of the cap housing. The housing 19 is typically made of plastics material, but may be made from metal or wood.

The housing 19 holds a casing 22 containing an electrical circuit which is powered by a cable 18 connected to a suitable power source, such as a 12-volt power source. Alternatively, the electrical circuit may be powered by a battery contained within housing 19 which is trickle charged by a photovoltaic panel (not shown) mounted on top of the housing 19.

Figure 4:
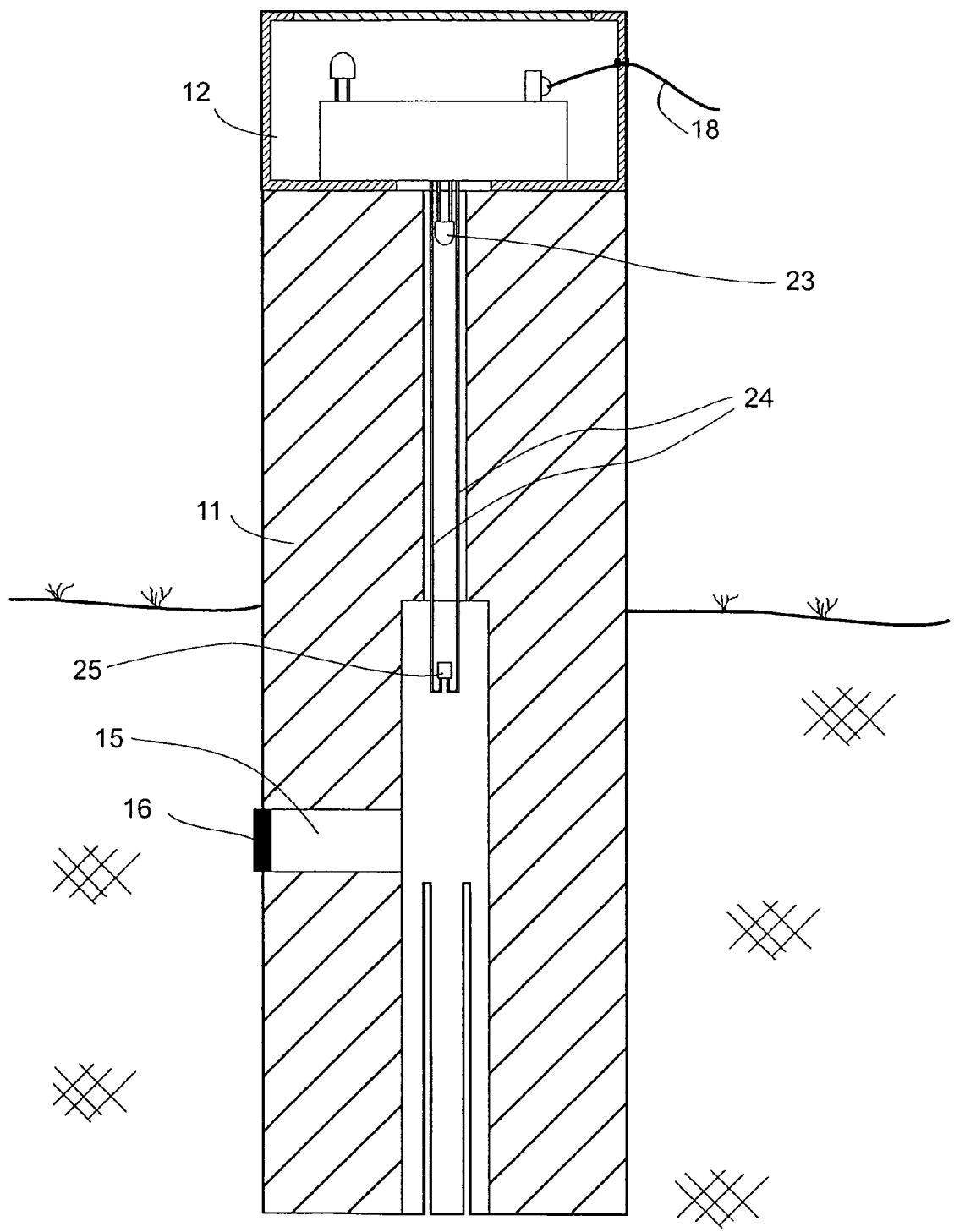
FIG. 4 is a part-sectional elevation of the device of FIG. 1 when installed.

The electrical circuit includes a high intensity light emitting diode (LED) 23 positioned below the casing 22 and extending below the housing 19. A pair of stiff, parallel, electrically conductive wires 24 also extend downwardly from the casing 22, to a greater extent than the LED 23. The wires 24 are connected to respective terminals of a light sensor 25, which may be a photo transistor, a photo resistor, or other suitable optical sensor. The wires 24 connect the light sensor to the electrical circuit. When the cap 12 is fitted to the peg 11, the rigid wires 24 extend through the narrow passage formed by the upper bore 13, and position the light sensor 25 in the cavity formed by the lower bore 14, as shown in FIG. 4, to receive light from the LED 23 through the narrow passage.

An alarm light, such as a red LED 26, is also connected to the electrical circuit and is located on top of the casing 22, so as to be visible through the insert 20.

Figure 5:
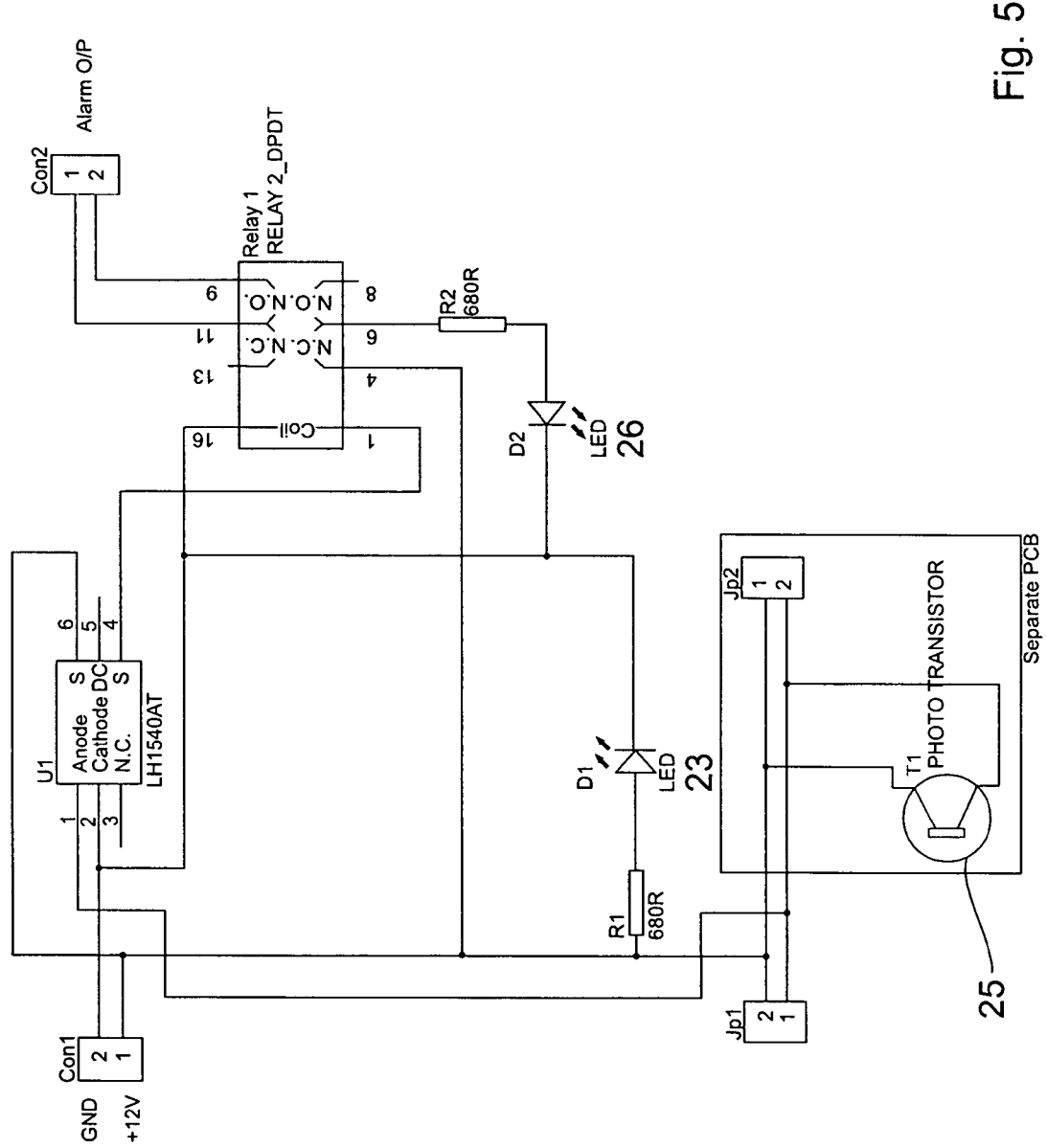
FIG. 5 is a circuit diagram of the electrical circuit of the device of FIG. 1.

An electrical circuit diagram, showing the operative connection between the LED 23, photo transistor 25 and alarm LED 26, is shown in FIG. 5. The cable 18 is connected to terminal Con 1 of the electrical circuit shown in FIG. 5.

Jumper connections Jp1 and Jp2 allow the photo transistor 25 to be tested. Terminal Con 2 provides a separate alarm output which can be connected, for example, to an audio alarm, and/or a central monitoring station.

In use, a termite bait (not shown) is inserted into the cavity 14. The termite bait may be cardboard, wood shavings, cork or other material attractive to termites, (If the peg 11 is formed of wood, it may itself serve as the bait for the termites, in which case it is not necessary to insert a termite bait within the cavity 14). The peg 11 is then partially buried in the ground at the desired location, as shown in FIG. 4. The cable 18 is connected to the power source (not shown).

When the termite detector 10 is activated, the LED 23 emits light through the upper bore 13 onto the photo transistor 25. While the circuit is energised and the photo transistor 25 is detecting light impinging on it, the alarm LED 26 is not activated. However, if the circuit is energised, and the photo transistor 25 does not detect sufficient light impinging on it, the alarm LED 26 is activated by the electrical circuit. The activated alarm LED 26 is visible through the insert 20 at the top of the cap 12. switched on intermittently. For example, the LED 23 may be switched on and off for, say, 12 hours at a time, to simulate night and day. (The light sensor 25 is automatically disabled when the LED 23 is switched off).

If termites are in the vicinity of the peg 11, they will be attracted to it and initially attack the outside of the underground portion of the peg. The termites gain access to the bore 14 (and any bait therein) through the bottom opening of the bore and/or through the slots 17 in the peg 11. Since the bulk of wood is aboveground, the termites will tend to eat into the upper part of the peg from the inside. As the termites are phytophagous or otherwise averse to light, they will tend to block out the light from the LED 23 by forming "mud" trails in the bore 13 from soil detrius and eventually plug the bore 13. When the bore 13 is obstructed, or at least partially obstructed, by the mud plug or trails, the amount of light received by the light sensor 25 will fall below a predetermined level. The drop in the output of the light sensor is detected by the integrated circuit U1 in the electrical circuit, which switches Relay 1 to power the alarm LED 26 (and energise the alarm output).

By visual inspection through the viewing insert panel 20 in the cap 12, a user can observe whether the alarm LED 26 is illuminated, indicating termite activity in the peg 11. If the alarm output is connected to an audio alarm or a central monitoring station, termite activity can also be detected aurally and/or electronically.

In one application of the invention, a plurality of the termite detectors 10 are located in a desired area, and connected to a base or central monitoring station. On receipt of an alarm signal from any of the detectors 10, the base station activates an alarm, or automatically contacts the property owner by telephone.

Although the termite detector is particularly suitable for outdoor use, it is not limited thereto, and can be used indoors, or in confined areas, such as in intra-wall spaces. In one internal application, a small access hole is made in the wall of the building, and a small version of the detector is inserted through the hole into the wall cavity. A suitable cover may be placed over the hole for aesthetic purposes. Depending on the access to the cavity for wires, the detector can be either wired back to a base station as described above, or function as a "stand alone" unit with its own power supply and alarm LED. If termite activity is detected, the activated alarm LED will be visible (after first removing the cover plate, if necessary).

The device of this invention can be made in compact form and used in various locations where termite activity is to be monitored, e.g. in wooden poles.

It is to be noted that the termite detector will not attract termites into a building or to a particular ground area. It will only attract termites if they are already within the building or in the vicinity of the location where the detector is used.

When the alarm is generated, appropriate treatment can be applied. For example, poison may be applied through the access bore 15 to coat the termites. The termites take the poison back to the colony where it is passed on to other termites.

The bait peg described above has several advantages, including:

The bait peg has no moving parts, thereby increasing its reliability.

The bait peg does not rely on the termites having to eat through material.

As the building of the mud plug is one of the first tasks undertaken by the termites, the bait peg provides an early indication of the presence of termites.

The bait peg can be electronically monitored continuously.

The bait peg is suitable for indoor or outdoor use.

The bait peg can be manufactured economically.

The foregoing describes only one embodiment of the invention, and modifications which are obvious to those skilled in the art may be made thereto without departing from the scope of the invention.

For example, instead of the powered LED 23, the light means may comprise solar radiation, i.e. natural light. In this embodiment, the circuit casing 22 is displaced to one side of the housing 19 so that sunlight can pass through the transparent insert 20 and bore 13, to impinge on the light sensor 25. An additional light sensor can be placed in the cap 12, and the electrical circuit compares the light received by the light sensor 25 with that received by the light sensor in the cap 12, to allow for varying light levels during night and day, or passing shadows. If there is a significant variation in the comparative light levels sensed by the two light sensors, the electrical circuit will recognise such variation as indicating blockage of the bore 13, and hence probable termite activity.

The invention claimed is:

1. A device for detecting the presence of termites and other light averse insects, the device including
    a cavity into which termites may enter,
    a light sensor located in the cavity, and having an output which is responsive to the detection of visible light in the cavity,
    a narrow passage communicating with the cavity, through which both the cavity and light sensor operatively receive visible light, the passage being adapted to be at least partially blocked by material deposited and left therein by the light averse insects, to thereby shield the light sensor from visible light from the passage, and
    an electrical circuit connected to the output of the light sensor for signalling an alarm or alert condition when the light sensor does not detect sufficient light due to blockage of the passage by the material deposited and left in the passage by the insects.

2. A device as claimed in claim 1, further comprising a light emitter positioned to emit the visible light into the cavity through the passage.

3. A device as claimed in claim 2, wherein the light emitter is an electrical light emitting device.

4. A device as claimed in claim 1, wherein the light is natural sunlight.

5. A device as claimed in claim 1, further comprising an alarm connected to the electrical circuit for signalling when the light sensor does not detect sufficient light.

6. A device as claimed in claim 5, wherein the alarm comprises a light emitting device.

7. A device as claimed in claim 5, wherein the alarm comprises a sound emitting device.

8. A device as claimed in claim 1, wherein the device comprises
    a peg member having the cavity, light sensor and the narrow passage therein, and
    a cap member having the electrical circuit therein, the cap member being fitted to the top of the peg member.

9. A device as claimed in claim 8, wherein the peg member is a tubular wooden peg having a plurality of slots in its lower end.

10. A device as claimed in claim 1, in combination with a base station connected to the device for monitoring the output thereof.

11. A method for detecting the presence of light averse insects such as termites, comprising the steps of installing a device as claimed in claim 1 at a location where the presence of light averse insects is to be detected, and monitoring the output of the electrical circuit to detect the alarm or alert condition.

12. A method as claimed in claim 11, wherein the step of installing the device comprises at least partially burying the device in the ground.

13. A method as claimed in claim 11, wherein the step of installing the device comprises inserting the device in a wall cavity of a building.

14. A method for detecting the presence of termites and other light averse insects, comprising the steps of providing visible light through a narrow passage to a space in which the presence of such insects is to be detected, positioning a light sensor in the space to receive the visible light only through the passage, the passage being adapted to be at least partially blocked by material deposited and left therein by the light averse insects to thereby shield the light sensor from the visible light, and detecting when the light sensor does not detect sufficient light through the passage due to blockage of the passage by the material deposited and left in the passage by the insects.

15. A method as claimed in claim 14, further comprising the step of signalling an alarm or alert condition when the light sensor does not detect sufficient light.

16. A method as claimed in claim 14, wherein the detecting step is performed by an electrical circuit connected to the output of the light sensor.

17. A method as claimed in claim 14, wherein the light is sunlight.

18. A method as claimed in claim 14, wherein the light is provided by an electrical light emitting device mounted on a device, the light sensor is an electrical photosensitive device located in a cavity in the device, and the passage is an internal bore extending through the device from the light emitting device to the cavity.

* * * * *